United States Patent
Lejeune et al.

(10) Patent No.: US 8,631,430 B2
(45) Date of Patent: Jan. 14, 2014

(54) ENABLING DRM-ENCRYPTED BROADCAST CONTENT THROUGH GATEWAY INTO THE HOME

(75) Inventors: Stephane Lejeune, San Diego, CA (US); Brant L. Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 13/166,122

(22) Filed: Jun. 22, 2011

(65) Prior Publication Data

US 2012/0131606 A1    May 24, 2012

Related U.S. Application Data

(60) Provisional application No. 61/415,100, filed on Nov. 18, 2010.

(51) Int. Cl.
| | |
|---|---|
| *H04N 7/16* | (2011.01) |
| *H04N 7/167* | (2011.01) |
| *G06F 17/30* | (2006.01) |
| *G06F 21/00* | (2013.01) |

(52) U.S. Cl.
USPC .......... 725/31; 726/2; 726/9; 726/14; 726/16; 726/17; 705/51; 380/200; 380/201; 380/202; 380/203; 380/204

(58) Field of Classification Search
USPC ............... 725/25–31; 380/200–204; 726/2, 4, 726/7–9, 16–31; 705/51
See application file for complete search history.

(56) References Cited

U.S. PATENT DOCUMENTS

| | | | |
|---|---|---|---|
| 7,039,938 B2 * | 5/2006 | Candelore | 725/87 |
| 7,120,250 B2 * | 10/2006 | Candelore | 380/200 |
| 7,124,303 B2 * | 10/2006 | Candelore et al. | 713/193 |
| 7,127,619 B2 * | 10/2006 | Unger et al. | 713/193 |
| 7,139,398 B2 * | 11/2006 | Candelore et al. | 380/200 |
| 7,151,831 B2 * | 12/2006 | Candelore et al. | 380/200 |
| 7,242,773 B2 * | 7/2007 | Candelore | 380/240 |
| 7,346,163 B2 * | 3/2008 | Pedlow et al. | 380/210 |
| 7,409,702 B2 * | 8/2008 | Cao | 725/110 |
| 7,549,056 B2 * | 6/2009 | Carr | 713/189 |
| 8,516,603 B2 | 8/2013 | Rothschild et al. | |

(Continued)

FOREIGN PATENT DOCUMENTS

| | | | | |
|---|---|---|---|---|
| WO | WO 2007/049942 A1 * | 5/2007 | | H04L 9/32 |
| WO | WO 2008/154283 | 12/2008 | | |

OTHER PUBLICATIONS

Young, "Multi-Stream CableCARD Interface," Cable Labs, Mar. 31, 2005.

(Continued)

*Primary Examiner* — Nassar M. Goodarzi
(74) *Attorney, Agent, or Firm* — Miller Patent Services; Jerry A. Miller

(57) ABSTRACT

A method consistent with certain implementations involves receiving a stream of legacy encrypted main content that contains selectively DRM encrypted duplicate content; decrypting the legacy encrypted stream of content; eliminating the duplicate content that is not DRM encrypted; generating a selectively DRM encrypted stream of content; and providing the selectively DRM stream of content as an output signal for consumption by a device residing on a home entertainment network. This abstract is not to be considered limiting, since other embodiments may deviate from the features described in this abstract.

9 Claims, 8 Drawing Sheets

(56) References Cited

U.S. PATENT DOCUMENTS

| | | | |
|---|---|---|---|
| 2003/0026423 A1* | 2/2003 | Unger et al. | 380/217 |
| 2005/0097597 A1* | 5/2005 | Pedlow et al. | 725/31 |
| 2005/0102702 A1* | 5/2005 | Candelore et al. | 725/100 |
| 2005/0147247 A1* | 7/2005 | Westberg et al. | 380/200 |
| 2005/0169473 A1* | 8/2005 | Candelore | 380/239 |
| 2005/0182931 A1 | 8/2005 | Robert et al. | |
| 2005/0192904 A1* | 9/2005 | Candelore | 705/51 |
| 2005/0204391 A1* | 9/2005 | Hunleth et al. | 725/78 |
| 2006/0271987 A1 | 11/2006 | Eisenberg et al. | |
| 2007/0005506 A1* | 1/2007 | Candelore | 705/59 |
| 2007/0028260 A1 | 2/2007 | Williams et al. | |
| 2007/0208668 A1* | 9/2007 | Candelore | 705/57 |
| 2007/0250872 A1* | 10/2007 | Dua | 725/81 |
| 2008/0107265 A1* | 5/2008 | Bonan et al. | 380/210 |
| 2008/0120667 A1 | 5/2008 | Zaltsman | |
| 2008/0123846 A1* | 5/2008 | Candelore | 380/203 |
| 2008/0168523 A1* | 7/2008 | Ansari et al. | 725/131 |
| 2008/0263621 A1* | 10/2008 | Austerlitz et al. | 725/139 |
| 2009/0208006 A1* | 8/2009 | Candelore | 380/200 |
| 2009/0296940 A1 | 12/2009 | Moroney et al. | |
| 2010/0049989 A1* | 2/2010 | Lee | 713/189 |
| 2010/0058485 A1* | 3/2010 | Gonzalez | 726/27 |
| 2010/0088697 A1* | 4/2010 | Clardy et al. | 718/1 |
| 2011/0271092 A1* | 11/2011 | Brelay et al. | 713/150 |

OTHER PUBLICATIONS

Anonymous, "Cable Operator Deployment of CableCARD/Host Technology," Motorola, Oct. 2003.

Anonymous, "Security Impacts of Next-Generation Set-Top Boxes," Cloakware, 2008.

* cited by examiner

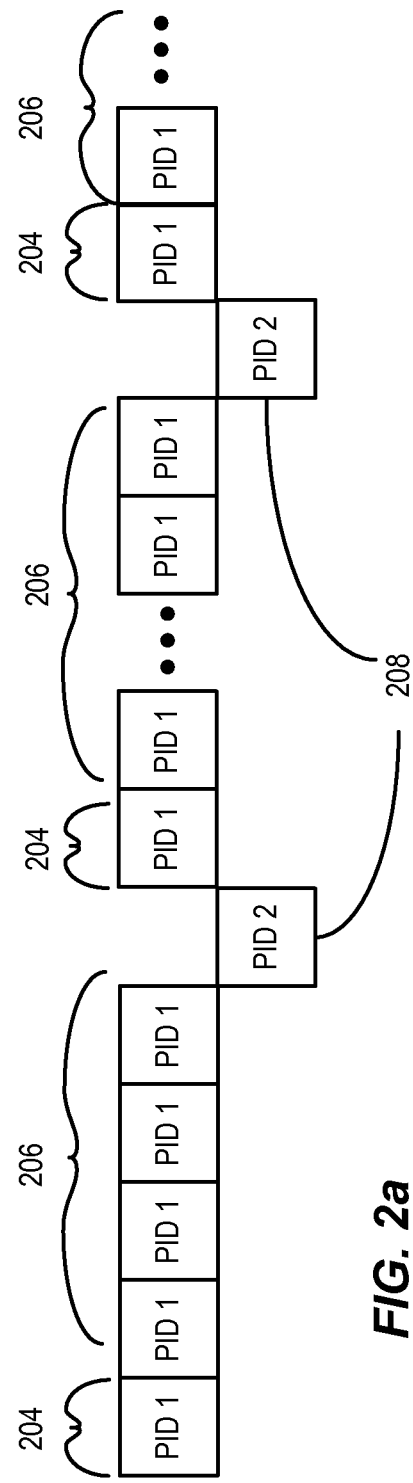

400

ENABLING DRM-ENCRYPTED BROADCAST CONTENT THROUGH GATEWAY INTO THE HOME

CROSS REFERENCE TO RELATED DOCUMENTS

This application is related to and claims priority benefit of U.S. Provisional Patent Applications 61/415,100 filed Nov. 18, 2010 to Lejeune, et al. which is hereby incorporated by reference. This application is also related to U.S. Provisional Patent Application Ser. No. 60/516,157 filed Oct. 31, 2003 to Pedlow et al. for "Bi-Directional Indices for Trick Mode Navigation of Video On Demand Playback" which is hereby incorporated by reference. This application is also related to U.S. patent applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein. Each of these documents relate to basic PASSAGE™ technology.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The Passage™ initiative (Passage is a trademark of Sony Electronics Inc.), promoted by Sony, provides a mechanism for MSOs (Multiple Service Operators) to deploy non-legacy headend equipment, subscriber devices and services on their existing legacy networks. The Passage technologies were developed to allow the independent coexistence of two or more content security systems, e.g. conditional access or Digital Rights Management (DRM), on a single, common plant. Some of the basic processes, selective multiple encryption and packet swapping, used in these technologies are discussed in detail in the above-referenced pending patent applications.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIGS. 2a, 2b and 2c (collectively FIG. 2) are content streams received by the digital gateway receiver consistent with certain embodiments of the present invention.

DETAILED DESCRIPTION

Figure 1:
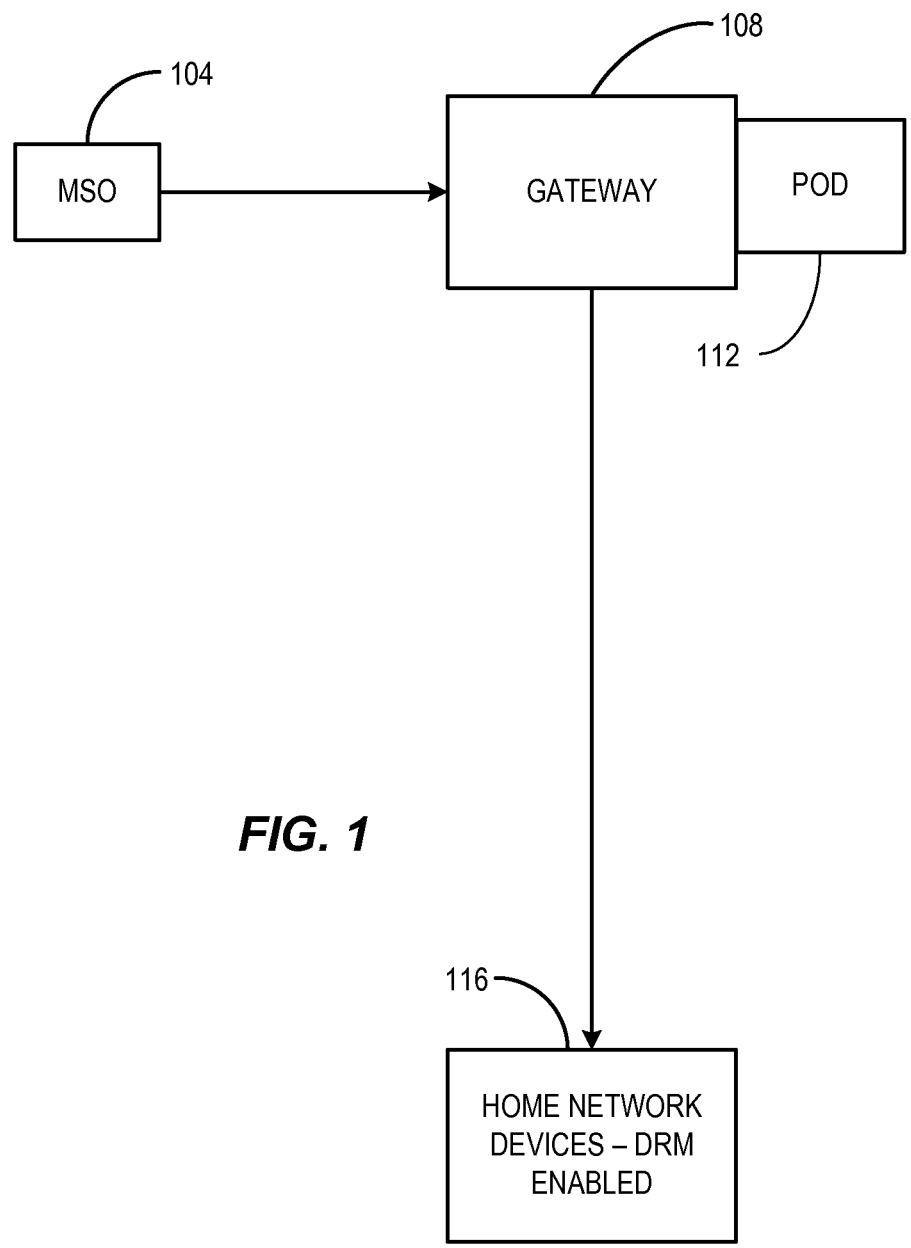
FIG. 1 is an example of an implementation of a system using a digital receiver as a gateway to a home entertainment network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. In this discussion, the use of the term "Program" is generally consistent with that of the MPEG-2 Systems standard (ISO/IEC 13818-1). An MPEG-2 Program has the associated Elementary Stream components, such as for example one video Elementary Stream and one or more audio Elementary Streams. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "Critical Packet" as used herein is a packet that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.

The terms "Selective Encryption" or "Partial Encryption" as used herein means encryption of only a portion of an elementary stream in order to render the stream difficult or impossible to use (i.e., view or hear).

The term "Dual Selective Encryption" and similar terms as used herein means encryption of portions of a single selection of content under two separate encryption systems to produce duplicate encrypted content encrypted under two separate encryption systems, and is not to be confused with double encrypting the same content twice to produce two layers of encryption without duplicates.

The term "Selective Multiple Encryption" and similar terms as used herein means encryption of portions of a single selection of content under more than one separate encryption systems. This term is generic to dual selective encryption and extends the concept to two or more than two duplicates.

The term "Legacy" as used herein is intended to refer to encryption methods, devices and other features of encryption systems that an incumbent service provider is using in a network and is widely deployed (thus rendering it difficult to deviate from). For example, set-top boxes that are used by the thousands by a cable television service provider which are all dependent upon a particular equipment provider's proprietary encryption technique.

Packet swapping is the process whereby a receiver selects the appropriate encrypted content and disregards the versions of encrypted content that don't apply.

The description that follows discusses transport streams however the same concept may be used with Internet Protocol (IP) streams. Using transport streams, with selective multiple encryption, the clear content is identified using a primary Packet Identifier (PID). A secondary PID is also assigned to the program content. Selected portions of the content are encrypted under two (or more) encryption systems and the encrypted content transmitted using both the primary and secondary PIDs (one PID or set of PIDs for each security system).

With packet swapping, the so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (e.g., secondary PIDs remapped to the primary PID value or vice versa).

There is a trend towards more adaptive devices called "gateway receivers". The gateway receivers are able to receive content from the cable headend, conditional access decrypt it, copy protect it, and then retransmit the still compressed content to other devices within the home. Because the service provider can manage the gateway receiver, it can be more easily updated and upgraded to the needed transmission parameters and protocols needed to access content from that service provider. Downstream devices can employ a much simpler method for sharing or gaining access to content. One method for sharing content received by the gateway uses Universal Plug and Play (UPnP) protocols. And copyrighted content may be copy protected using DTCP-over-IP. Content may also be re-encrypted using DRM. The subject of the present invention uses an entirely different method using Passage technologies—already DRM encrypted content is delivered directly from the headend and under the control of the gateway device.

Three separate scenarios are discussed for sending this DRM content to networked devices in the home. In all the cases, secondary packets are encrypted with a second or alternate security system, e.g. DRM. In the first scenario, the gateway receiver merely tunes and modulates a stream and passes it into the home network. In this scenario, the downstream network home device must be knowledgeable about Passage. In the second scenario the gateway decrypts the primary content and packets swaps the encrypted secondary packet for the clear primary critical packet. In the third scenario, the primary and secondary packets must be decrypted by the first security system, e.g. the legacy CA. This leaves the secondary packet still encrypted with the second security system, e.g. DRM. The gateway then swaps the encrypted secondary packet for the clear primary critical packet (as in scenario 2).

The digital receiver gateway may implement the first security system using embedded conditional access or a consumer detachable device such as a POD module, e.g. CableCARD, USB2 module or enhanced SIM. With modules, it is possible to do the packet swapping in addition to the normal stream decryption. Embedded conditional access may employ an embedded cryptographic processor or a detachable device such as a smart card. With embedded approaches, the stream and decryption and manipulation is done in the host device. It really does not matter where or how the stream is decrypted with the first security system or how packet swapping is accomplished. These and other techniques will be made clear in the following description.

The terms "decrypt" and "descramble" and variations thereof are used synonymously herein. Likewise, the terms encrypt and scramble and variations thereof are used synonymously herein. They involve the transformation of key and data information using a key and an encryption and decryption (descrambling and descrambling) algorithm like the Digital Encryption Standard (DES) or the Advanced Encryption Standard (AES).

The terms "DRM" and "CA" are used synonymously herein for purposes of this document, although it is recognized that there are distinctions between the two terms in many instances. DRM which stands for "Digital Rights Management" is a security approach that typically involves software-only implementations. CA which stands for "conditional access" typically involves hardware implementations. However, each can to the same security functionality which is to ensure the payment of subscription or video-on-demand (VOD) fees as well as, in some cases, copy protection and copy management functionality. Encryption systems may generally be referred to as security systems herein.

Passage™ is a Trademark of Sony Electronics Inc. for various single and multiple selective encryption systems, devices, processes and related enabling technology.

First tier MSOs (Multiple Service Operators) such as Comcast, Cox and Cablevision fully encrypt the cable television programming content using 100% legacy CA (Conditional Access) encryption from the cable headend. An additional small percentage (e.g., 1%) of the packets can be selected as critical packets which are delivered encrypted under a DRM (Digital Rights Management) encryption in an "ordered stream" using Sony's Passage Selective Multiple Encryption technology. In this scenario, for example, each DRM encrypted packet is inserted into the stream ahead of the content it is to replace. The content it is to replace is a duplicate copy of the DRM encrypted packet.

DRM encryption is known in many proprietary and publically available forms including those available from Microsoft Corporation, Apple Computer Corporation and other companies by way of example and not limitation.

A digital gateway receiver, when received at the user's premises, may or may not contain a CableCARD™ (or Point of Deployment (POD) module). In either case, the host or the module carries out the function of decrypting the CA encrypted content and then packet swaps the DRM encrypted content for the decrypted clear critical content. The host or the module then operates as a gateway for any other devices on a home entertainment network or otherwise connected for consumption using selective DRM decryption. That is, the DRM selectively encrypted content is streamed into the home to devices requiring that particular type of DRM.

It is also possible for other DRM systems to be aware of the content key in order to share it. And thus it would be possible to support additional DRM systems without the need to necessarily add additional encrypted packets for those DRM systems. The use of selective multiple encryption with multiple DRM systems, where additional encrypted packets are needed, is discussed in U.S. Pat. No. 7,555,464 and U.S. Pat. No. 7,120,250 which are hereby incorporated for reference. Key sharing for DRM interoperability is discuss in U.S. Pat. No. 7,840,489 and is hereby incorporated for reference.

This approach maintains the digital gateway receiver as the main controlling device in the home, which may be an attractive alternative to the incumbent MSOs.

This basic process is shown in the accompanying figures in which three scenarios are depicted as shown in the following table where reference numbers refer to FIG. 1:

Turning now to FIG. 1, an example MSO 104, may send content which is selectively encrypted in scenario 1 and 100% legacy encrypted in scenarios 2 and 3 to a network of digital gateway receivers represented by a single gateway receiver 108. In addition to the legacy encryption, the content includes a small portion of DRM encrypted packets that are selected as critical packets and which are preferably in an ordered stream for easy identification of the location of the DRM encrypted packets. The gateway 108 in this example utilizes a POD or CableCARD 112 which is utilized for decryption and packet swapping processing. It should be understood that in some scenarios the decryption and packet swapping could be done in the gateway 108 and that the POD or CableCARD 112 are not necessarily required.

By use of selective DRM encryption, the content can remain protected for purposes of protection of the content from pirating, but can be made available for any single DRM enabled receiver device on the home entertainment network 116. If the selectively DRM encrypted content is actually selectively multiple encrypted using DRM encryption, multiple different types of player devices can be supported in a single stream by filtering out the unneeded encrypted segments of the content.

With reference to FIG. 2 starting with FIG. 2a, the content as sent from MSO 104 to the gateway 108 is depicted in accord with Scenario 1 as described above. In this scenario, content encrypted using the first security system (encryption) is depicted as 204 using PID 1 (packet identifier example number 1) for example and content sent in the clear is depicted as 206 also using PID 1 for example while duplicate copies of critical content encrypted with the second security system is depicted as 208 using PID 2 for example.

Figure 2B:
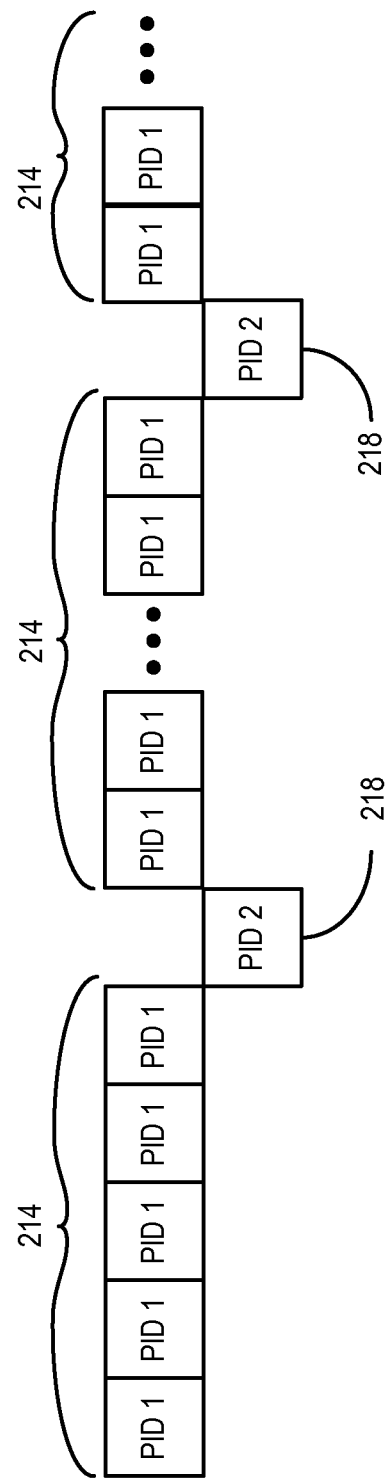

With reference to FIG. 2b, the content as sent from MSO 104 to the gateway 108 is depicted in accord with Scenario 2 as described above. In this scenario, content is encrypted using the first security system is shown as 214 using PID 1 for example and duplicate copies of critical encrypted content using the second security system are shown as 218 using PID 2 for example. With Scenario 2, there is no content sent in the clear.

TABLE 1

|  | Signal out from MSO 104 | Operation of Gateway 108 | Signal from Gateway 108 to Devices 116 | Operation of Devices 116 |
| --- | --- | --- | --- | --- |
| Scenario 1 | Selective multiple encryption | Optional legacy decrypter (local consumption), and optional content swapping | Selectively DRM encrypted content. Small % of critical packets are DRM encrypted | Content swapping DRM decrypter |
| Scenario 2 | 100% legacy encrypted with additional small percentage of DRM encrypted critical packets | Legacy decrypter overa all primary content and content swapping | Selectively DRM encrypted content. Small % of critical packets are DRM encrypted | DRM decrypter |
| Scenario 3 | 100% legacy encrypted with additional small % double encrypted first with DRM and second with legacy encryption | Legacy decrypter overall primary and secondary content, and content swapping | Selectively DRM encrypted content. Small % of critical packets are DRM encrypted | DRM decrypter |

Figure 2C:
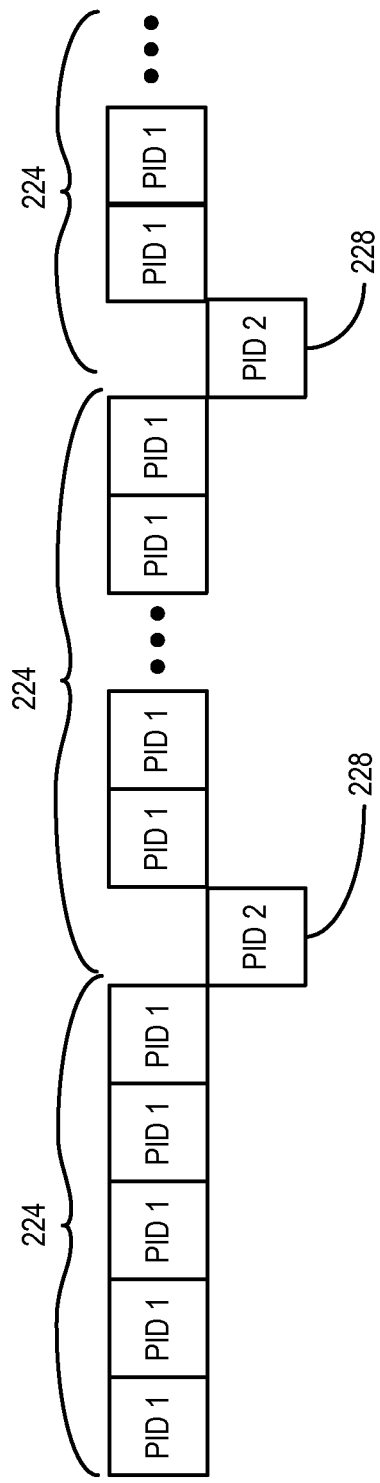

With reference to FIG. 2c, the content as sent from MSO 104 to the gateway 108 is depicted in accord with Scenario 3 as described above. In this scenario, content encrypted using the first security system is depicted as 224 using PID 1 for example and duplicate copies of critical double encrypted content with second (applied first) and first security systems are depicted as 228 using PID 2 for example. As with Scenario 2, Scenario 3 does not have any content sent in the clear.

Figure 3A:
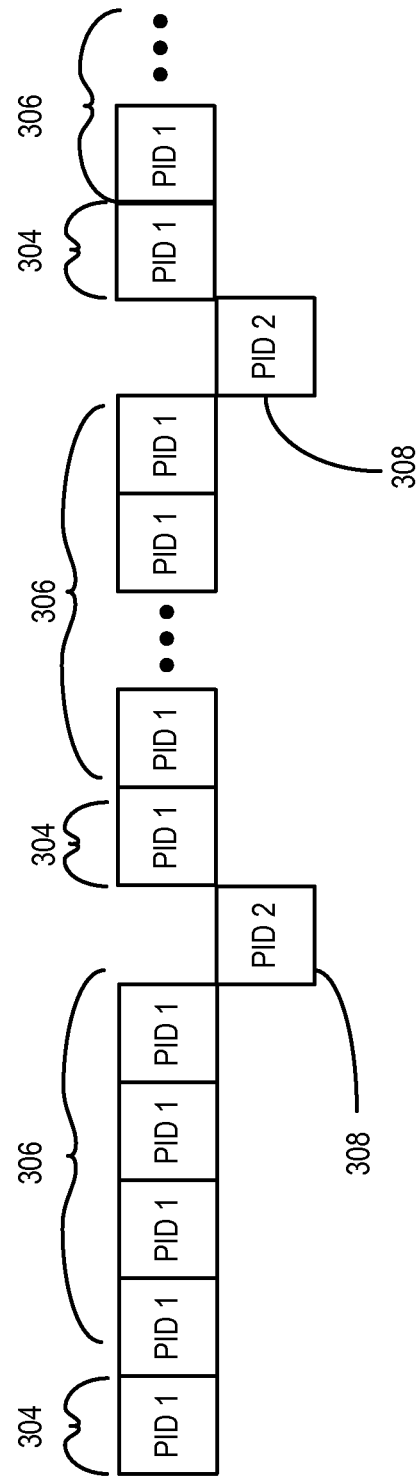
FIGS. 3a and 3b (collectively FIG. 2) are content streams received by home network devices consistent with certain embodiments of the present invention.
Figure 3B:
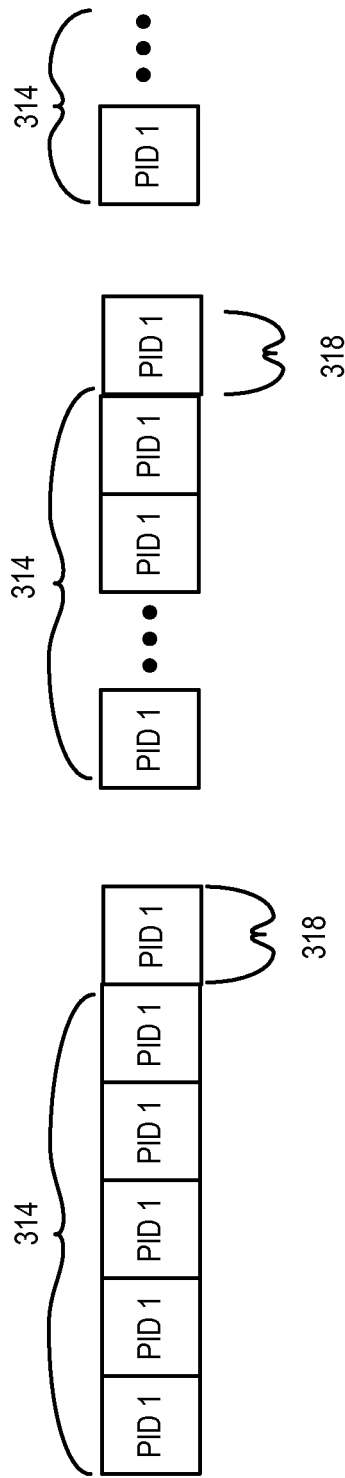

With reference now to FIG. 3 starting with FIG. 3a, the content as sent from the gateway 108 to the home network devices 116 is depicted in accord with Scenario 1 as described above. In this scenario, content is encrypted using the first security system 304 using PID 1 for example. Content sent in the clear is depicted by 306 while duplicate copies of critical encrypted packets using the second security system is depicted as 308 using PID 2 for example. It is possible for the gateway device to packet swap PID 2 308 with PID 1 304 prior to sending the stream out into the home network. In that instance, all the packets would be marked PID 1. And the legacy encrypted packet 304 would be dropped. The stream would be selectively encrypted with both encrypted and clear packets similar to what is shown in FIG. 3b.

With reference to FIG. 3b, the content as sent from gateway 108 to the home network devices 116 is depicted in accord with Scenario 2 as described above. In this scenario, content 314 is sent in the clear while content 318 is the duplicate copies of critical content encrypted with the second security system.

Figure 4:
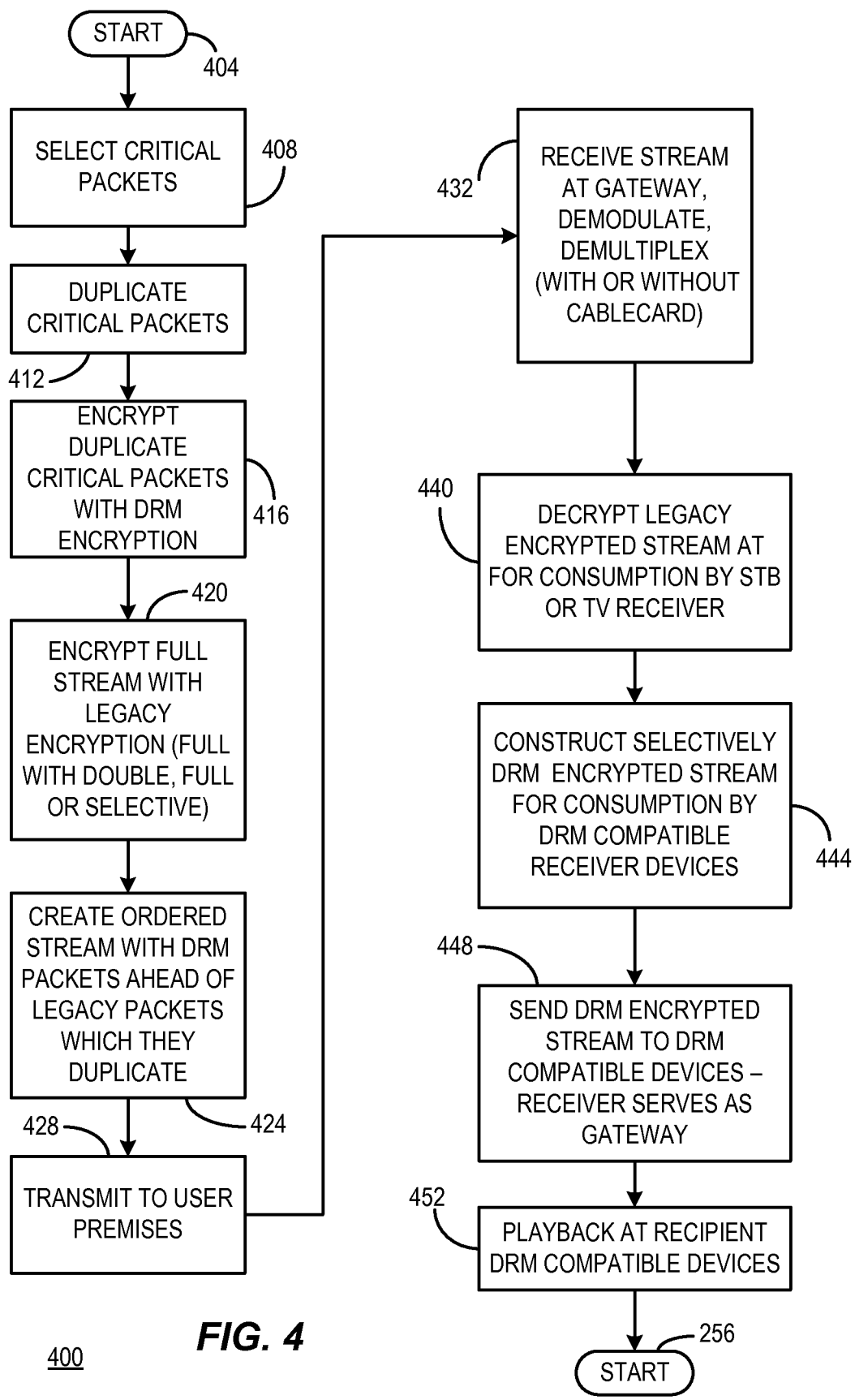
FIG. 4 is a flow chart of an example process consistent with certain embodiments of the present invention.

With reference to FIG. 4, an example process 400 consistent with certain implementations is depicted starting at 404. In this example, at a service provider such as an MSO's headend, content is examined and critical packets as defined above are selected for encryption at 408. In one technique, these critical packets may be duplicated at 416 so that selective DRM encryption can take place on one of the duplicates. At 420, the MSO encrypts the full stream either fully or selectively including the DRM encrypted selection (or not) with the legacy encryption process. The MSO then creates at 424 an ordered stream with DRM packets, for example, ahead of their duplicate legacy packets for ease of identifying the DRM encrypted packets. The stream can then be broadcast through the MSO's network to the user premises at 428, completing the primary actions of the MSO.

At the user premises, at 432 the stream is received at a suitable digital gateway receiver device such as a television set or set-top box which may or may not be equipped with a POD card such as a CableCARD or similar card in a satellite system. The received stream is demodulated, demultiplexed, etc. and the digital stream is passed to the POD card at 432 if present, or processed internally if no card is present. At 440, this stream can either be legacy decrypted at the receiver device or in the POD card, but in any event the legacy decrypted stream is available at for consumption by the receiver device (e.g., the STB or TV).

Meanwhile, at 444, the digital gateway receiver constructs a selectively DRM encrypted stream which drops the duplicate packets in favor of the DRM encrypted packets so that the resulting stream is selectively encrypted with DRM encryption. This stream is thereby available from the POD card serving as a home entertainment network gateway to any device compatible with the DRM encryption method used. At 448, the DRM encrypted stream can be sent to storage or directly streamed to a DRM compatible receiver device for playback at 452. The process ends at 256.

Figure 5:
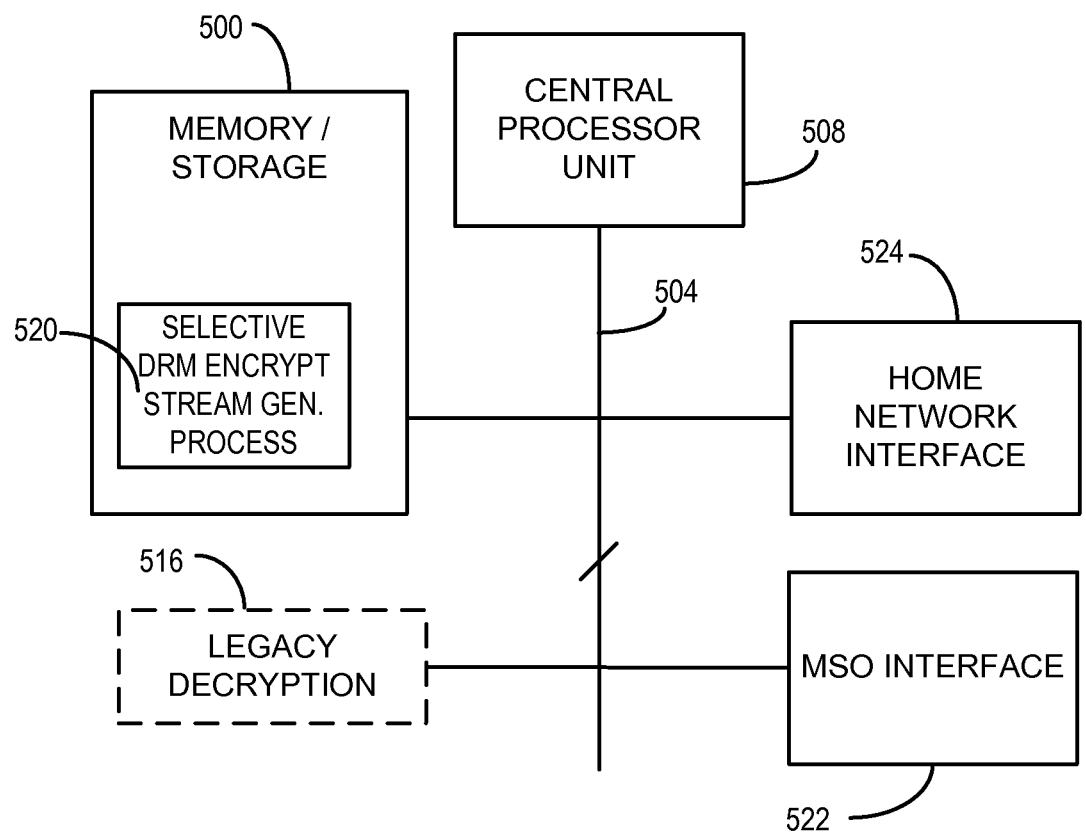
FIG. 5 is a block diagram of an example digital receiver consistent with certain embodiments of the present invention.

The operation in processing the encrypted stream is depicted in an example digital gateway receiver as depicted in FIG. 5. Memory and storage 500 can be any combination of storage devices—volatile and non-volatile depicted collectively as 500 in FIG. 5 for convenience. The memory/storage 500 is coupled in any suitable manner such as via one or more data buses 504 with processor 508 to carry out programmed actions. Legacy decryption is carried out in block 516 which may be a POD card or transport descrambler in the digital receiver device. Once the stream is in the form of a selectively DRM encrypted stream by process 520 which may be carried out at a POD card, the stream received via a suitable MSO interface 522 and is sent out over a home entertainment network interface 524 (e.g., an IEEE 1394 compliant network interface or an Ethernet interface or a wireless interface) for consumption by a DRM compatible receiver device, or a storage device.

While the prior embodiment depicts the DRM encryption being carried out at the MSO headend, in alternate implementations, the DRM encryption can be carried out in the POD card without limitation to create the selective DRM encrypted stream.

Thus, a method consistent with certain implementations involves receiving a stream of legacy encrypted main content that contains selectively DRM encrypted duplicate content; decrypting the legacy encrypted stream of content; eliminating the duplicate content that is not DRM encrypted; generating a selectively DRM encrypted stream of content; and providing the selectively DRM stream of content as an output signal for consumption by a device residing on a home entertainment network.

A method consistent with certain implementations has at a television set-top box, receiving a stream of legacy encrypted main content that contains selectively DRM encrypted duplicate content; decrypting the legacy encrypted stream of main content to produce a legacy decrypted stream of content; removing any duplicate content that is not DRM encrypted; and providing the selectively DRM encrypted stream as an output signal for consumption by a player device residing on a home entertainment network.

In certain implementations, the process further involves identifying the duplicate DRM encrypted content as main content. In certain implementations, the legacy decrypting is carried out by a POD card. In certain implementations, the identifying the duplicate DRM encrypted content as main content is carried out on a POD card. In certain implementations, the stream of legacy encrypted content contains an ordered selectively DRM encrypted representation of the content.

Another method consistent with certain implementations involves at a television set-top box, receiving a stream of selectively encrypted content that contains legacy encrypted and DRM encrypted duplicate content; decrypting the legacy encrypted content to produce a legacy decrypted stream of content for local consumption; and providing the selectively encrypted content that contains legacy encrypted and DRM encrypted duplicate content stream as an output signal for consumption by a player device residing on a home entertainment network.

In certain implementations, the legacy decrypting is carried out by a POD card. In certain implementations, the POD card is CableCARD specification or DVB Common Interface specification compliant. In certain implementations, the stream of legacy encrypted content contains an ordered selectively DRM encrypted representation of the content.

Another method involves at a television set-top box, receiving a stream of legacy encrypted main content that contains selectively double encrypted duplicate content with DRM and legacy conditional access; decrypting the legacy encrypted stream of main content to produce a legacy decrypted stream of content; decrypting the DRM and legacy encrypted duplicate content to produce a legacy decrypted stream of content that still has DRM encryption; removing any duplicate content that is not DRM encrypted; and providing the selectively DRM encrypted stream as an output signal for consumption by a player device residing on a home entertainment network.

In certain implementations, the process involves identifying the duplicate DRM encrypted content as main content. In certain implementations, the decrypting the legacy encrypted stream is carried out by a legacy decryption processor residing on a POD card. In certain implementations, the identifying the duplicate DRM encrypted content as main content is carried out on a POD card. In certain implementations, the POD card is CableCARD specification or DVB Common Interface specification compliant. In certain implementations, the stream of legacy encrypted content contains an ordered selectively DRM encrypted representation of the content.

Another method consistent with certain implementations involves receiving a stream of legacy encrypted main content that contains selectively DRM encrypted duplicate content; sending the stream of content to a Point of Deployment (POD) card; at the PID card, decrypting the legacy encrypted stream of content at the POD; at the POD card, eliminating duplicate content that is not DRM encrypted; providing the stream of selectively DRM encrypted content as an output signal for consumption by a device residing on a home entertainment network.

In certain implementations, the legacy decrypting is carried out prior to receipt of the stream by the POD card. In certain implementations, the POD card is CableCARD specification or DVB Common Interface specification compliant. In certain implementations, the stream of legacy encrypted content contains an ordered selectively DRM encrypted representation of the content.

An example Point of Deployment (POD) module consistent with certain implementations has a receiver interface for interconnection of the POD module to a television receiver device. A programmed processor is coupled to the receiver interface, where the programmed processor being programmed to: receive a stream of content via the interface, the content containing legacy encrypted main content that contains selectively DRM encrypted duplicate critical content; generate a selectively DRM encrypted stream of content that is free of duplicates of the critical content; and provide the stream of DRM encrypted content as an output signal at the receiver interface.

In certain implementations, the stream of content is legacy encrypted and where the module comprises a legacy encryption decrypter that decrypts the legacy decryption. In certain implementations, the module identifies the DRM encrypted content as main content. In certain implementations, the stream of legacy encrypted content contains an ordered selectively DRM encrypted representation of the content. In certain implementations, the POD card is CableCARD specification or DVB Common Interface specification compliant.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
    at a home network gateway, receiving an ordered stream of selectively multiple encrypted main content that is broadcast over a Multiple Service Operator's (MSO) network and contains duplicate content that is encrypted using multiple conditional access (CA) encryption methods including a legacy encryption method;
    at the home network gateway, sending the ordered stream of selectively multiple encrypted main content to an attached point of deployment (POD) card;
    at the POD card, decrypting the legacy encrypted portion of the ordered stream of selectively multiple encrypted main content to produce a decrypted stream of content;
    at the POD card, packet swapping any duplicate content that is not decrypted;
    at the POD card, removing any duplicate content that is not DRM encrypted and generating a selectively multiple DRM encrypted stream of content from the legacy decrypted stream of content by encrypting selected critical packets of the decrypted stream of content and providing DRM encrypted critical packets having a different packet identifier than the duplicate content that is not decrypted, where the DRM encryption comprises a specified type of DRM;
    at the POD card, sending only the selectively multiple DRM encrypted stream of content to the home network gateway, and
    at the home network gateway, providing the selectively multiple DRM encrypted stream as an output signal through a home network interface forming a part of the home network gateway to a plurality of player devices on a home network for consumption by the plurality of player devices having the ability to packet swap, consume and decrypt the selectively multiple DRM encrypted stream of content of the specified type of DRM residing on the home entertainment network.

2. The method according to claim 1, where the identifying the duplicate content is carried out on the POD card coupled to the home network gateway.

3. The method according to claim 1, where the POD card is CableCARD specification or DVB Common Interface specification compliant.

4. A method, comprising:
- at a home network gateway, receiving an ordered stream of selectively encrypted main content that is broadcast over a Multiple Service Operator's (MSO) network and contains duplicate content that is encrypted using multiple conditional access (CA) encryption methods including a legacy encryption method;
- at the home network gateway, sending the ordered stream of selectively multiple encrypted main content to an attached point of deployment (POD) card, where the POD card is CableCARD specification or DVB Common Interface specification compliant;
- at the POD card, decrypting at least a portion of the legacy encrypted portion of the ordered stream of selectively multiple encrypted main content to produce a decrypted stream of content;
- at the POD card, packet swapping any duplicate content that is not decrypted;
- at the POD card, removing any duplicate content that is not DRM encrypted and generating a selectively multiple DRM encrypted stream of content from the legacy decrypted stream of content by encrypting selected critical packets of the decrypted stream of content and providing DRM encrypted critical packets having a different packet identifier than the duplicate content that is not decrypted, where the DRM encryption comprises a specified type of DRM;
- at the POD card, sending only the selectively multiple DRM encrypted stream of content to the home network gateway, and
- at the home network gateway, providing the selectively multiple DRM encrypted stream as an output signal for consumption by a plurality of player devices through a home network interface forming a part of the home network gateway, the plurality of player devices having the ability to packet swap and consume and decrypt the selectively multiple DRM encrypted stream of content of the specified type of DRM residing on a home entertainment network.

5. The method according to claim 4, where the decrypting carried out by the POD card comprises conditional access decrypting.

6. A Point of Deployment (POD) module, comprising:
- a receiver interface for interconnection of the POD module to a home network gateway, the home network being configured to an ordered stream of selectively multiple encrypted main content that is broadcast over a Multiple Service Operator's (MSO) network and contains duplicate content that is encrypted using multiple conditional access (CA) encryption methods including a legacy encryption method, the home network gateway being further configured to send the ordered stream of selectively multiple encrypted main content to an attached point of deployment (POD) card;
- one or more programmed processors coupled to the receiver interface and forming a part of the POD card;
- the one or more programmed processors being programmed to:
  - decrypt the legacy encrypted portion of the ordered stream of selectively multiple encrypted main content to produce a decrypted stream of content;
  - packet swap any duplicate content that is not decrypted;
  - remove any duplicate content that is not DRM encrypted and generate a selectively multiple DRM encrypted stream of content from the legacy decrypted stream of content by encrypting selected critical packets of the decrypted stream of content and provide DRM encrypted critical packets having a different packet identifier than the duplicate content that is not decrypted, where the DRM encryption comprises a specified type of DRM; and
- send only the selectively multiple DRM encrypted stream of content to the home network gateway so that the home network gateway can provide the selectively multiple DRM encrypted stream as an output signal through a home network interface forming a part of the home network gateway to a plurality of player devices on a home network for consumption by the plurality of player devices having the ability to packet swap, consume and decrypt the selectively multiple DRM encrypted stream of content of the specified type of DRM residing on the home entertainment network.

7. The POD module according to claim 6, where the stream of content is legacy encrypted and where the module comprises a legacy encryption decrypter that decrypts the legacy decryption.

8. The POD module according to claim 6, where the POD card is CableCARD specification or DVB Common Interface specification compliant.

9. The POD module according to claim 6, where the one or more programmed processors are further programmed to identify the duplicate content.

* * * * *